United States Patent
Kim et al.

(10) Patent No.: US 6,779,055 B2
(45) Date of Patent: Aug. 17, 2004

(54) FIRST-IN, FIRST-OUT MEMORY SYSTEM HAVING BOTH SIMULTANEOUS AND ALTERNATING DATA ACCESS AND METHOD THEREOF

(75) Inventors: John J. Kim, Moutain View, CA (US); Richard G. Collins, Autsin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 482 days.

(21) Appl. No.: 09/885,574

(22) Filed: Jun. 20, 2001

(65) Prior Publication Data

US 2002/0199042 A1 Dec. 26, 2002

(51) Int. Cl.[7] .............................. G06F 3/06; G06F 3/00
(52) U.S. Cl. .......................................... 710/52; 710/53
(58) Field of Search ..................... 710/52–57; 348/441, 348/448; 358/13; 364/200, 900; 375/240.21; 341/136

(56) References Cited

U.S. PATENT DOCUMENTS 5,305,319 A    4/1994  Sowell ........................ 711/170
6,055,616 A    4/2000  Panwar ........................ 711/170

FOREIGN PATENT DOCUMENTS

EP    0869431 A1    10/1998
FR    2636448       3/1990
JP    59177782      8/1984

OTHER PUBLICATIONS

Stofka, "Serial/Parallel Shifts Increase RAM speed," Electrical Design News, vol. 26, No. 1, 2 pgs. (1981).
PCT International Search Report (PCT/US02/1455).

Primary Examiner—Jeffrey Gaffin
Assistant Examiner—Joshua D Schneider
(74) Attorney, Agent, or Firm—Daniel D. Hill; Robert L. King

(57) ABSTRACT

A first-in, first-out (FIFO) memory system (10) includes first and second FIFOs (A and B). First and second multiplexers (12, 14) each have two input terminals for receiving data. An output terminal of the first multiplexer (12) is coupled to the first FIFO (A) and an output terminal of the second multiplexer (14) is coupled to the second FIFO (B). In response to the data being one data type, write control logic (90, 95, 100) is used to cause the data to be alternately written to the first and second FIFOs (A, B). In response to the data being a second data type, write control logic (90, 95, 100) is used to cause the data to be simultaneously written to the first and second FIFOs (A, B).

20 Claims, 2 Drawing Sheets

FIRST-IN, FIRST-OUT MEMORY SYSTEM HAVING BOTH SIMULTANEOUS AND ALTERNATING DATA ACCESS AND METHOD THEREOF

FIELD OF THE INVENTION

This invention relates generally to integrated circuits having memory system storage, and more specifically, to integrated circuits which utilize First-In, First-Out (FIFO) memory structures.

BACKGROUND OF THE INVENTION

In a real time debug system implemented on an integrated circuit data processing system, it is necessary to first store the debug messages before outputting the messages to a debugging tool. A first-in, first-out (FIFO) memory system is generally used to temporarily store the debug messages. Some of the messages may have multiple entries that need to be stored simultaneously and others need to be stored singly.

In order to store both kinds of messages in the same FIFO structure, a dual port FIFO may be used or separate, dedicated FIFOs may be used. However, a dual port FIFO requires a large surface area to implement because multiplexers are required on every entry of the FIFO to allow storage of both message types. Also, the large number of multiplexers requires a significant amount of logic to control the multiplexer select lines, with a corresponding increase in power consumption due to logic switching.

Another way to implement the FIFO memory system is to use two separate dedicated FIFOs. For example, one FIFO may receive only address information and the other FIFO may receive only data. This has the advantages of smaller surface area on an integrated circuit and less design complexity. However, it may lead to less efficient FIFO utilization when compared to the dual port FIFO because one of the FIFOs can become full and overflow while the other FIFO is not full.

Therefore, it would be desirable to have a FIFO memory system that makes efficient use of its storage area while also minimizing the control logic necessary to implement it.

BRIEF DESCRIPTION OF THE DRAWINGS

The present invention is illustrated by way of example and not limitation in the accompanying figures, in which like references indicate similar elements.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

Figure 1:
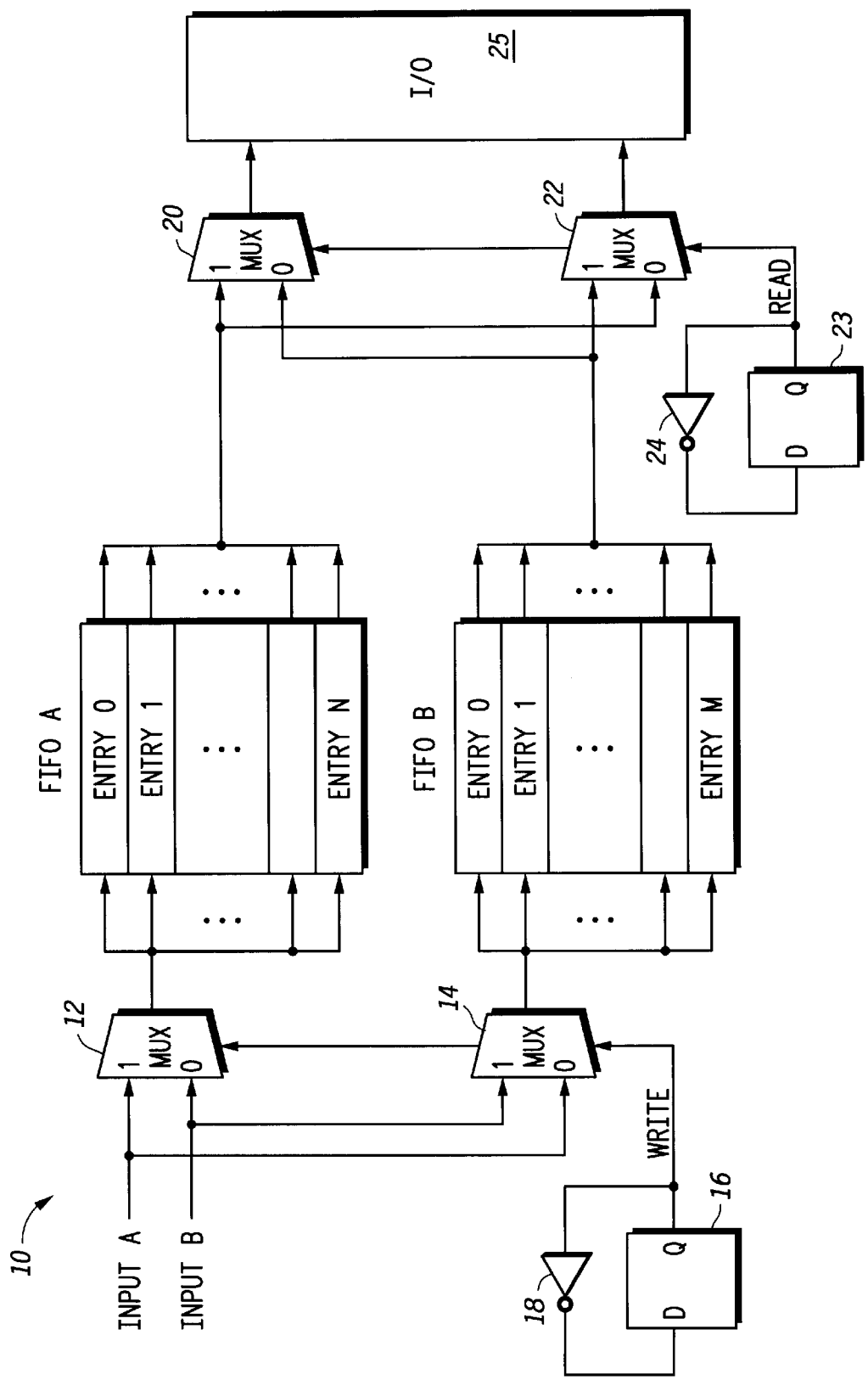
FIG. 1 illustrates in block diagram form a first-in, first-out memory system in accordance with an embodiment of the present invention.

Illustrated in FIG. 1 is a first-in, first-out (FIFO) Memory System 10 in accordance with the present invention. In one form, FIFO Memory System 10 has two FIFOs, illustrated as a FIFO A and a FIFO B. It should be well understood that FIFO Memory System 10 may be implemented with any number of FIFOs. Each of FIFO A and FIFO B may have an arbitrary number of storage entries. Assume that FIFO A has N entries and FIFO B has M entries, where N and M are integer values. An Input A is connected to a first input of a Multiplexer 12 and to a first input of a Multiplexer 14. An Input B is connected to a second input of Multiplexer 12 and to a second input of Multiplexer 14. A D-type Flip-Flop 16 provided at an output of flip-flop 16 provides a WRITE signal that is connected to a control input of each of Multiplexer 12 and Multiplexer 14. The output of Flip-Flop 16 is connected to an input of an Inverter 18. An output of Inverter 18 is connected to a D input of Flip-Flop 16. An output of Multiplexer 12 is connected to each entry, such as entry 0, entry 1 through entry N, of FIFO A. An output of Multiplexer 14 is connected to each entry, such as entry 0, entry 1 through entry M, of FIFO B. Each entry of FIFO A also has an output terminal that is connected together and connected to a first input of Multiplexer 20. Each entry of FIFO B also has an output terminal that is connected together and connected to a first input of Multiplexer 22. The output terminal of FIFO A is also connected to a second input of Multiplexer 20. The output terminal of FIFO B is also connected to a second input of Multiplexer 20. A D-type Flip-Flop 23 has a Q output for providing a READ control signal that is connected to a control terminal of each of Multiplexer 20 and Multiplexer 22. The output of Flip-Flop 23 is connected to an input of an Inverter 24. An output of Multiplexer 20 is connected to a first input of an Input/Output (I/O) unit 25. An output of Multiplexer 22 is connected to a second input of the Input/Output unit 25. The input/output unit interfaces with an I/O terminal (not shown).

In operation, FIFO Memory System 10 is capable of writing multiple entries simultaneously in an efficient manner. A single multiplexer, such as either Multiplexer 12 or Multiplexer 14 is placed at each write port, or input terminal, of either FIFO A or FIFO B, respectively. Assume for the purpose of explanation that information in the form of packets is received at Input A and Input B. A single packet or portion of data may be written to only one of FIFO A or FIFO B from either Input A or Input B in a manner as described below in connection with FIG. 2.

As illustrated in FIG. 1, two packets or portions of data from Input A and Input B may be written to FIFO A and FIFO B at the same time. Flip-flop 16 functions as a one-bit write register and the WRITE control signal is used to point to one of FIFO A or FIFO B. When the WRITE control signal has a logic one value, Multiplexer 12 selects Input A to provide as an output and Multiplexer 14 selects Input B to provide as an output. When the WRITE control signal has a logic zero value, Multiplexer 12 selects Input B to provide as an output and Multiplexer 14 selects Input A to provide as an output. Further, Inverter 18 functions to flip the logic state of Flip-Flop 16 every time that a single entry write operation occurs as controlled by a write clocking signal (not shown) which is connected to a clock input (not shown) of Flip-Flop 16. Additionally, should an operation in FIFO Memory System 10 be required to perform two write operations simultaneously, the logic state of Flip-Flop 16 remains the same. For simultaneous writing, information from each of Input A and Input B may be written or information successively coupled on only one of Input A or Input B may be written to FIFO A and FIFO B. In a similar manner for a single entry read operation, Flip-Flop 23 functions as a one-bit read register and the READ control signal is used to point to one of FIFO A or FIFO B. When the READ control signal has a logic one value, Multiplexer 20 selects the output of FIFO A to provide as an output and Multiplexer 22 selects the output of FIFO B to provide as an output. When the READ control signal has a logic zero value, Multiplexer 20 selects the output of FIFO B to provide as an output and Multiplexer 22 selects the output of FIFO A to provide as an output. The READ control signal is generated in response to a read clocking signal (not shown) that is connected to a clock input (not shown) of Flip-Flop 23. Further, Inverter 24 functions to flip the logic state of the flip-flops every time that a single read operation occurs. Additionally, when two read operations occur simultaneously the logic state of Flip-Flop 23 remains the same. Flip-Flop 23, Inverter 24 and Multiplexers 20 and 22 function to permit the reading of two packets or portions of data from FIFO A and FIFO B at the same time. In addition, a single packet or portion of data may be read from either FIFO via the output from either Multiplexer 20 or Multiplexer 22. Therefore, FIFO Memory System 10 is very efficient for storing multiple entries simultaneously in order to implement certain processing operations and for storing single entries when implementing other processing operations because the same FIFO memory structure may be used to accomplish both types of operations.

The use of only a single multiplexer circuit for each FIFO to accomplish a write operation to each FIFO represents a significant cost savings. Additional control circuitry is avoided in addition to avoiding a multiplexer per FIFO entry. As a result, a noticeable savings in power consumption is provided due to the few number of multiplexers that are used. Additional power savings also result from reduced control circuitry not needed when multiplexers are eliminated. The present invention is also scalable to use multiple FIFOs wherein only one multiplexer per FIFO is required to implement single and concurrent write operations in the system and only one multiplexer per FIFO is required to implement signal and concurrent read operations in the system. While only one multiplexer for supplying information to be written is connected to each FIFO, information from either Input A or Input B may be written into either FIFO A or FIFO B. It should be well understood that Input A and Input B may receive and store information in the form of data, address information, control information or a combination of two or more. Additionally, the word "data" may encompass all types of information that is stored in the illustrated FIFOs.

Figure 2:
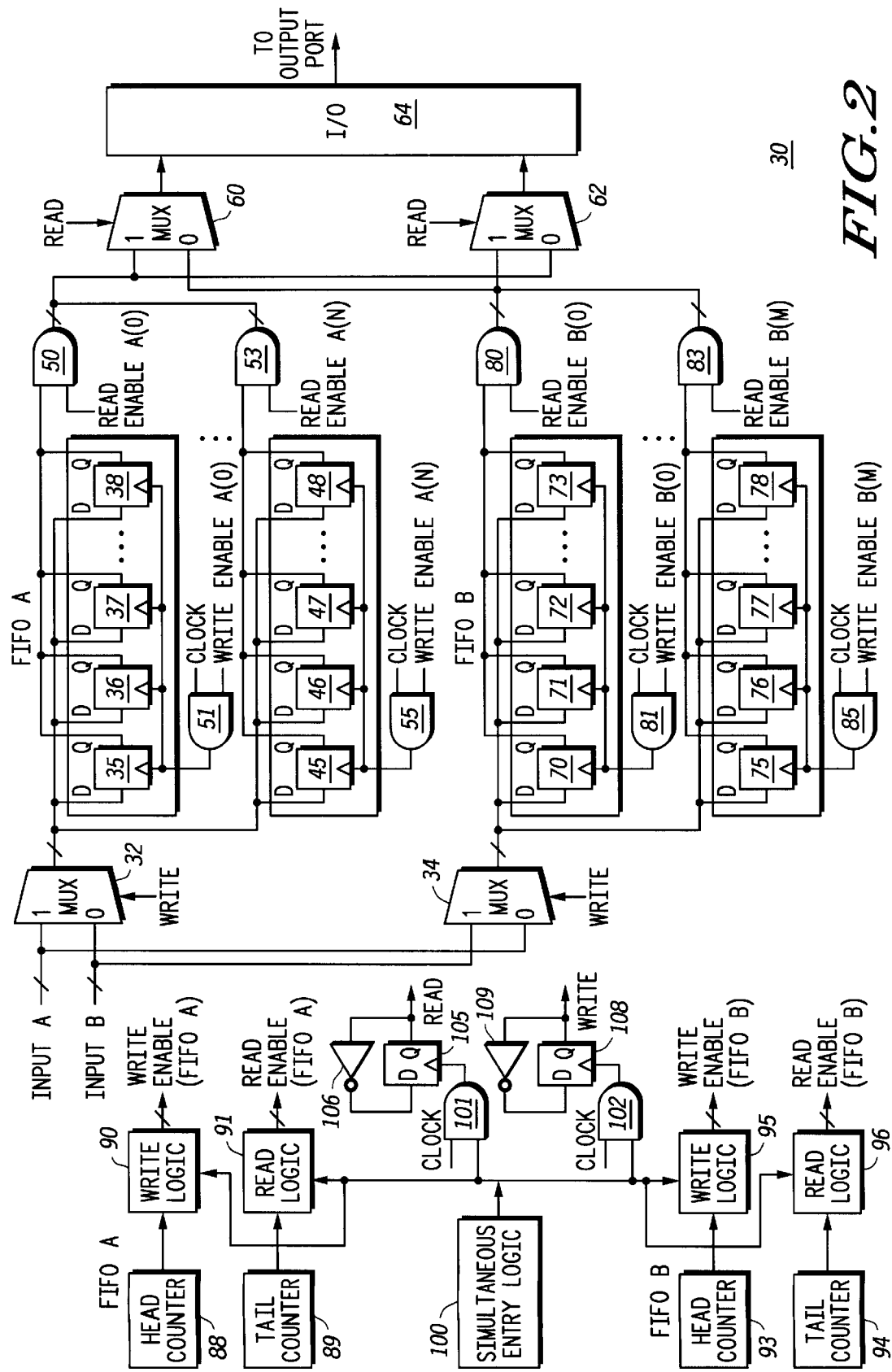
FIG. 2 illustrates in block diagram form further detail of the first-in, first-out memory system of FIG. 1.

Illustrated in FIG. 2 in more detail is one embodiment of the FIFO Memory System 10 of FIG. 1. As illustrated in FIG. 2, a FIFO Memory System 30 again has an Input A and an Input B for receiving information to be stored in one of FIFO A or FIFO B, or both. A Multiplexer 32 has a first input connected to Input A and has a second input connected to Input B. A Multiplexer 34 has a first input connected to Input A and has a second input connected to Input B. An output of Multiplexer 32 is connected to each of a plurality of N entries of FIFO A. A first entry of FIFO A has a plurality of flip-flop circuits, such as Flip-Flops 35–38. An Nth entry of FIFO A has a plurality of flip-flop circuits, such as Flip-Flops 45–48. Each of Flip-Flops 35–38 and 45–48 has a D input connected to the output of Multiplexer 32. Each of Flip-Flops 35–38 has a Q output connected to a first input of an AND gate 50. A second input of AND gate 50 is connected to a READ ENABLE A(0) signal, meaning the first Read Enable signal of FIFO A. An AND gate 51 has a first input for receiving a Clock signal, a second input for receiving a WRITE ENABLE A(0) signal (meaning the first Write Enable signal for FIFO A), and an output connected to each clock input of Flip-Flops 35–38. Each of Flip-Flops 45–49 has a Q output connected to a first input of an AND gate 53. A second input of AND gate 53 is connected to a READ ENABLE A(N) signal, meaning the Nth Read Enable signal of FIFO A. An AND gate 55 has a first input for receiving the Clock signal, a second input for receiving a WRITE ENABLE AN signal (meaning the Nth Write Enable signal for FIFO A), and an output connected to each clock input of flip-flops 45–48. An output of AND gate 50 is connected to an output of AND gate 53, to a first input of a Multiplexer 60 and to a first input of a Multiplexer 62. An output of Multiplexer 60 is connected to a first input of an Input/Output (I/O) unit 64.

An output of Multiplexer 34 is connected to each of a plurality of M entries of FIFO B. A first entry of FIFO B has a plurality of flip-flop circuits, such as Flip-Flops 70–73. An Mth entry of FIFO B has a plurality of flip-flop circuits, such as flip-flops 75–78. Each of Flip-Flops 70–73 and 75–78 has a D input connected to the output of Multiplexer 34. Each of Flip-Flops 70–73 has a Q output connected to a first input of an AND gate 80. A second input of AND gate 80 is connected to a READ ENABLE B(0) signal, meaning the first Read Enable signal of FIFO B. An AND gate 81 has a first input for receiving the Clock signal, a second input for receiving a WRITE ENABLE B(0) signal (meaning the first Write Enable signal for FIFO B), and an output connected to each clock input of Flip-Flops 70–73. Each of Flip-Flops 75–79 has a Q output connected to a first input of an AND gate 83. A second input of AND gate 83 is connected to a READ ENABLE B(M) signal, meaning the Mth Read Enable signal of FIFO B. An AND gate 85 has a first input for receiving the Clock signal, a second input for receiving a WRITE ENABLE B(M) signal (meaning the Mth Write Enable signal for FIFO B), and an output connected to each clock input of Flip-Flops 75–78. An output of AND gate 80 is connected to an output of AND gate 83, to a second input of a Multiplexer 60 and to a second input of a Multiplexer 62. An output of Multiplexer 62 is connected to a second input of an Input/Output (I/O) unit 64. The Input/Output unit 64 has an output that is connected to an output port. In one form, the output of Input/Output unit 64 is connected to a Nexus-compliant software tool for debugging purposes in implementing the IEEE ISTO 5001 standard.

Additionally, FIFO Memory System 30 has a Head Counter Circuit 88, a Tail Counter Circuit 89, Write Control Logic Circuitry 90 and Read Control Logic Circuitry 91 associated with FIFO A. FIFO Memory System 30 has a Head Counter 93, a Tail Counter Circuit 94, Write Control Logic Circuitry 95 and Read Control Logic Circuitry 96. Head Counter 88 and Tail Counter 89 have an output respectively connected to an input of Write Control Logic Circuitry 90 and Read Control Logic Circuitry 91. An output of Write Control Logic Circuitry 90 provides a Write Enable signal for FIFO A, and a first output of Read Control Logic Circuitry 91 provides a Read Enable signal for FIFO A. Head Counter 93 and Tail Counter 94 have an output respectively connected to an input of Write Control Logic Circuitry 95 and Read Control Logic Circuitry 96. An output of Write Control Logic Circuitry 95 provides a write enable signal for FIFO B, and a first output of Read Control Logic Circuitry 96 provides a read enable signal for FIFO B. A second output of Read Control Logic Circuitry 96 is connected to a second input of Write Control Logic Circuitry 95. A Simultaneous Entry Logic Circuit 100 has an output connected to a second input of Read Control Logic Circuitry 91, to a second input of Write Control Logic Circuitry 90, to a second input of Write Control Logic Circuitry 95, to a first input of an AND gate 101, to a first input of an AND gate 102 and to a second input of Read Control Logic Circuitry 96. The Clock signal is connected to a second input of each of AND gate 101 and AND gate 102. An output of AND gate 101 is connected to a clock input of a Flip-Flop 105. A Q output of Flip-Flop 105 provides a READ signal and is connected to an input of an inverter 106. An output of Inverter 106 is connected to a D input of Flip-Flop 105. An output of AND gate 102 is connected to a clock input of a Flip-Flop 108. A Q output of Flip-Flop 108 provides a WRITE signal and is connected to an input of an Inverter 109. An output of Inverter 109 is connected to a D input of Flip-Flop 108.

In operation, FIFO A and FIFO B, as illustrated in detail in FIG. 2, have specific entries using a plurality of flip-flop circuits such as Flip-Flops 35–38 for the first entry of FIFO A. The clock signal illustrated in FIG. 2 is a synchronous clock that is generated independently of the circuitry illustrated; the same clock signal is used for all clock inputs described. As with the operation of FIG. 1, when Multiplexer 32 receives the WRITE control signal in a logic one state, the Input A is passed to its output. When Multiplexer 32 receives the WRITE control signal in a logic zero state, the Input B is passed to its output. When Multiplexer 34 receives the WRITE control signal in a logic one state, the Input B is passed to its output. When Multiplexer 34 receives the WRITE control signal in a logic zero state, the Input A is passed to its output. Similarly, when the READ control signal is in a logic one state, Multiplexer 60 passes the output of FIFO A and Multiplexer 62 passes the output of FIFO B. When the READ control signal is in a logic zero state, Multiplexer 60 passes the output of FIFO B and Multiplexer 62 passes the output of FIFO A.

As illustrated, Head Counter 88 functions to keep a sequential count value that points to a designated beginning entry in FIFO A and Tail Counter 89 functions to keep a sequential count value that points to a designated last entry in FIFO A. FIFO A functions as a circular queue that has a beginning address and an ending address that wraps back around to the beginning address. The Write Control Logic Circuitry 90 and Read Control Logic Circuitry 91 are associated with FIFO A and use the Head Counter and the Tail Counter to control, in part, when a write or a read operation should be enabled. The outputs of Write Control Logic Circuitry 90 and Read Control Logic Circuitry 91 are multiple conductors, each of which correspond to a particular entry of FIFO A. The outputs of Head Counter 88 and Tail Counter 89 function as a pointer to FIFO A as these two outputs determine which entry within FIFO A is either written to or read from, respectively. The analogous operation occurs for FIFO B in connection with Head Counter 93, Tail Counter 94, Write Control Logic Circuitry 95 and Read Control Logic Circuitry 96.

The Simultaneous Entry Logic 100 functions to detect when in FIFO Memory System 30 a simultaneous write operation to both FIFOs A and B should occur, when a simultaneous read operation to both FIFOs A and B should occur, when a write operation to one of FIFO A or B with a read operation of the other FIFO should occur, when a read operation of one entry of one of FIFOs A or B should occur with a write operation of another entry of the same FIFO, and when a write operation to both FIFOs A and B should occur at the same time a read operation of different entries in both FIFOs A and B is occurring. There are numerous events and mechanisms that may signal when a simultaneous plural entry operation should occur. For example, in a data processing system certain instructions may be decoded and a processor (not shown) may direct that simultaneous multiple FIFO operations should occur. Also, for example, in a data processing system, the simultaneous entry logic circuit 100 may cause the write control logic circuit to write data to the first and second FIFO memories simultaneously in response to the first and second data inputs receiving a first data type. In one form, data that is being communicated with FIFO A and FIFO B is a real time debug message in connection with a data processing debug function. Simultaneous entry operation is implemented through the generation of multiple Read and Write enable signals for one or more of the FIFOs. If there is a simultaneous entry event, AND gates 101 and 102 become inactive thus disabling the clock to Flip-Flops 105 and 108. The disabling of Flip-Flops 105 and 108 prevents the toggling operation of Multiplexers 32 and 34 between FIFOs A and B in the manner previously discussed in connection with FIG. 1. The disabling of the toggling operation permits the next entry access to occur with the same FIFO before the simultaneous entry event began.

By now it should be appreciated that there has been provided a FIFO memory structure having simplified overhead and reduced power consumption. The FIFO memory system taught herein is compact and provides cost and power savings. In one use, the present invention is particularly advantageous for debug circuitry commonly implemented in processing systems. Because multiple information entries need to be stored simultaneously, the control and circuitry associated with this function is greatly reduced by the use of the present invention. It should be well understood that the present invention may be used in processing systems utilizing a FIFO storage structure for purposes other than in connection with debug. Additionally, the present invention may be implemented with any type of transistors and with any type of semiconductor manufacturing process.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A first-in, first-out (FIFO) memory system, comprising:
   a first multiplexer having a first data input terminal, a second data input terminal, a data output terminal, and a control terminal;
   a first FIFO memory having a plurality of entries, each of the plurality of entries having an input terminal coupled to the data output terminal of the first multiplexer;
   a second multiplexer having a first data input terminal coupled to the first data input terminal of the first multiplexer, a second data input terminal coupled to the second data input terminal of the first multiplexer, a data output terminal, and a control terminal;
   a second FIFO memory having a plurality of entries, each of the plurality of entries having an input terminal coupled to the data output terminal of the second multiplexer; and
   a control logic circuit for providing a control signal for causing a write control signal to be provided to the control terminals of each of the first and second multiplexers, wherein when the control signal is in a first logic state, the write control signal for alternately writing a plurality of data entries received at the first and second data inputs to the first and second FIFO memories alternately entry-by-entry, and when the control signal is in a second logic state, the write control signal for writing the plurality of data entries to the first and second FIFO memories simultaneously.

2. The FIFO memory system of claim 1, wherein the control logic circuit for causing the write control logic circuit to write data to the first and second FIFO memories simultaneously in response to the first and second data inputs receiving a first data type, and the control logic circuit for causing the write control logic circuit to write data to the first and second FIFO memory alternately in response to the first and second data inputs receiving a second data type.

3. The FIFO memory system of claim 1, further comprising:
   a third multiplexer having a first data input terminal coupled to a data output terminal of each of the plurality of entries of the first FIFO memory, a second data input terminal coupled to a data output terminal of the plurality of entries of the second FIFO memory, and a control terminal;
   a fourth multiplexer having a first data input terminal coupled to a data output terminal of each of the plurality of entries of the first FIFO memory, a second data input terminal coupled to a data output terminal of the plurality of entries of the second FIFO memory, and a control terminal; and
   a read control logic circuit for providing a read control signal to the control terminals of each of the third and fourth multiplexers, the read control logic for causing data to be read from the first and second FIFO memories in the same order in which the data was written.

4. The FIFO memory system of claim 1, wherein each of the plurality of entries comprises a plurality of flip-flop circuits for storing the data.

5. The FIFO memory system of claim 1, wherein the plurality of data entries is characterized as being a real time debug message.

6. The FIFO memory system of claim 1, further comprising:
   a first counter for sequentially pointing to each of the plurality of entries of the first FIFO memory while writing data to the first FIFO memory; and
   a second counter for sequentially pointing to each of the plurality of entries of the second FIFO memory while writing data to the second FIFO memory.

7. The FIFO memory system of claim 1, wherein the write control logic circuit comprises:
   an inverter having an input terminal and an output terminal; and
   a flip-flop having an input terminal coupled to the output terminal of the inverter, and an output terminal coupled to the input terminal of the inverter, the output terminal of the flip-flop for providing the write control signal.

8. A first-in, first-out (FIFO) memory system, comprising:
   a first multiplexer having a first data input terminal, a second data input terminal, a data output terminal, and a control terminal;
   a first FIFO memory having a plurality of entries, each of the plurality of entries having an input terminal coupled to the data output terminal of the first multiplexer;
   a second multiplexer having a first data input terminal coupled to the first data input terminal of the first multiplexer, a second data input terminal coupled to the second data input terminal of the first multiplexer, a data output terminal, and a control terminal;
   a second FIFO memory having a plurality of entries, each of the plurality of entries having an input terminal coupled to the data output terminal of the second multiplexer;
   a write control logic circuit for providing a write control signal to the control terminals of each of the first and second multiplexers; and
   a simultaneous entry logic circuit, coupled to the write control logic circuit, for providing a control signal of a first logic state for causing the write control logic circuit to write data to the first and second FIFO memories simultaneously in response to the first and second data inputs receiving a first data type, and for providing a control signal of second logic state for causing the write control logic circuit to write data to the first and second FIFO memories alternately in response to the first and second data inputs receiving data of a second data type.

9. The FIFO memory system of claim 8, further comprising:
   a third multiplexer having a first data input terminal coupled to a data output terminal of each of the plurality of entries of the first FIFO memory, a second data input terminal coupled to a data output terminal of the plurality of entries of the second FIFO memory, and a control terminal;
   a fourth multiplexer having a first data input terminal coupled to a data output terminal of each of the plurality of entries of the first FIFO memory, a second data input terminal coupled to a data output terminal of the plurality of entries of the second FIFO memory, and a control terminal; and
   a read control logic circuit for providing a read control signal to the control terminals of each of the third and fourth multiplexers, the read control logic for causing data to be read from the first and second FIFO memories in the same order in which the data was written.

10. The FIFO memory system of claim 8, wherein each of the plurality of entries comprises a plurality of flip-flop circuits for storing the data.

11. The FIFO memory system of claim 8, wherein the data is characterized as being a real time debug message.

12. The FIFO memory system of claim 8, further comprising:
   a first counter for sequentially pointing to each of the plurality of entries of the first FIFO memory while writing data to the first FIFO memory; and
   a second counter for sequentially pointing to each of the plurality of entries of the second FIFO memory while writing data to the second FIFO memory.

13. The FIFO memory system of claim 8, wherein the write control logic circuit comprises:
   an inverter having an input terminal and an output terminal; and
   a flip-flop having an input terminal coupled to the output terminal of the inverter, and an output terminal coupled to the input terminal of the inverter, the output terminal of the flip-flop for providing the write control signal.

14. A method for accessing a first-in, first-out (FIFO) memory system, the FIFO memory system having a first FIFO memory and a second FIFO memory, each of the first and second FIFO memories having a plurality of entries, an input terminal of each of the plurality of entries of the first FIFO memory coupled to an output terminal of a first multiplexer, and an input terminal of each of the plurality of entries of the second FIFO memory coupled to an output terminal of a second multiplexer, the method comprising the steps of:
   receiving data at a first input terminal of the first multiplexer and at a first input terminal of the second multiplexer;
   receiving data at a second input terminal of the first multiplexer and at a second input terminal of the second multiplexer;
   alternately writing the data from the output terminals of the first and second multiplexers to the first and second FIFO memories in response to a control signal from a control circuit being a first logic state; and
   simultaneously writing the data from the output terminals of the first and second multiplexers to the first and second FIFO memories in response to the control signal from the control circuit being a second logic state.

15. The method of claim 14, wherein the data is stored in the first and second FIFO memories in sequential entries in response to incrementing first and second counters, the first counter corresponding to the first FIFO memory and the second counter corresponding to the second FIFO memory.

16. The method of claim 14, wherein in the step of alternately writing, the data is written from the output terminals of the first and second multiplexers to the first and second FIFO memories in response to the data being a first data type.

17. The method of claim 14, wherein in the step of simultaneously writing, the data is written from the output terminals of the first and second multiplexers to the first and second FIFO memories in response to the data being a second data type.

18. The method of claim 14, further comprising the step of reading the data from both of the first and second FIFO memories in the same order in which the data was written to the first and second FIFO memories.

19. The method of claim 18, wherein the step of reading the data further comprises the steps of:
   receiving the data from the first FIFO memory at first input terminals of third and fourth multiplexers;
   receiving the data from the second FIFO memory at second input terminals of the third and fourth multiplexers; and
   providing the data from output terminals of the third and fourth multiplexers in the order in which the data was written to the first and second FIFO memories.

20. The method of claim 14, wherein in the steps of receiving data, the data is characterized as being a real time debug message.

* * * * *